2 Sheets—Sheet 1.

H. M. LITTELL.

Assignor of one-half to H. H. LITTELL.

TRACK SCRAPER FOR RAILROADS.

No. 10,895. Reissued Jan. 24, 1888.

Witnesses:
J. Harry Stuart.
Jos. A. Ryan.

Inventor.
Harvey M. Littell
By Chas. A. Barber
His atty. in fact.

N. PETERS, Photo-Lithographer, Washington, D. C.

2 Sheets—Sheet 2.

H. M. LITTELL.

Assignor of one-half to H. H. LITTELL.

TRACK SCRAPER FOR RAILROADS.

No. 10,895. Reissued Jan. 24, 1888.

Witnesses:
J. Harry Stuart.
Jos. A. Ryan.

Inventor.
Harvey M. Littell.
By Chas. E. Barber,
His atty. in fact.

N. PETERS, Photo-Lithographer, Washington, D. C.

UNITED STATES PATENT OFFICE.

HARVEY MITCHELL LITTELL, OF ST. PAUL, MINNESOTA, ASSIGNOR OF ONE-HALF INTEREST TO HARDIN H. LITTELL, OF LOUISVILLE, KENTUCKY.

TRACK-SCRAPER FOR RAILROADS.

SPECIFICATION forming part of Reissued Letters Patent No. 10,895, dated January 24, 1888.

Original No. 320,263, dated June 16, 1885. Application for reissue filed November 30, 1886. Serial No. 220,310.

*To all whom it may concern:*

Be it known that I, HARVEY MITCHELL LITTELL, of St. Paul, in the county of Ramsey and State of Minnesota, have invented certain new and useful Improvements in Track-Scrapers for Railroads; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to provide a track-cleaner which shall be easily and quickly operated when it is used for the removing of snow, stones, or other obstacles that would obstruct free passage over the track, and, further, the providing of such cleaner that will successfully withstand sudden shocks or concussion without breaking or becoming disconnected in any manner; and it consists in the construction, arrangement, and combination of parts, as will be hereinafter fully described, and pointed out in the annexed specification and claims, taken together with the accompanying drawings, in which—

Figure 1:
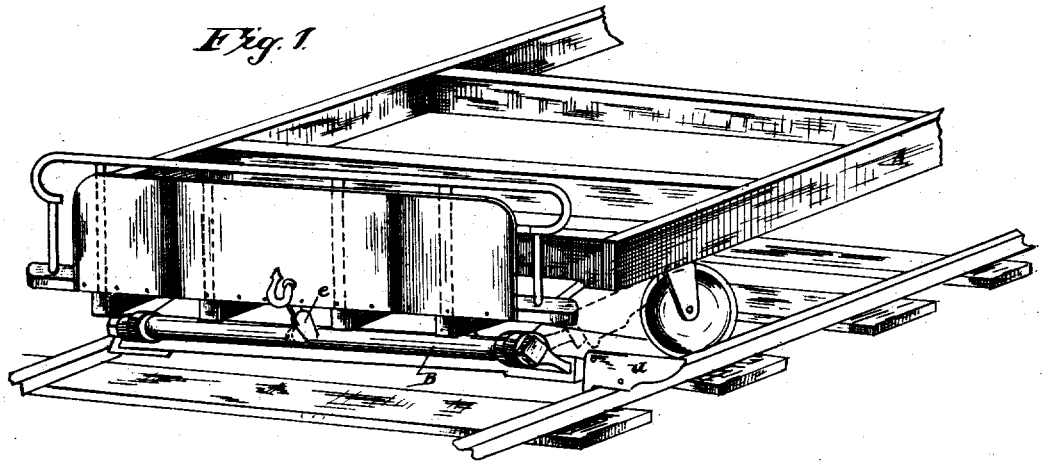
Figure 2:
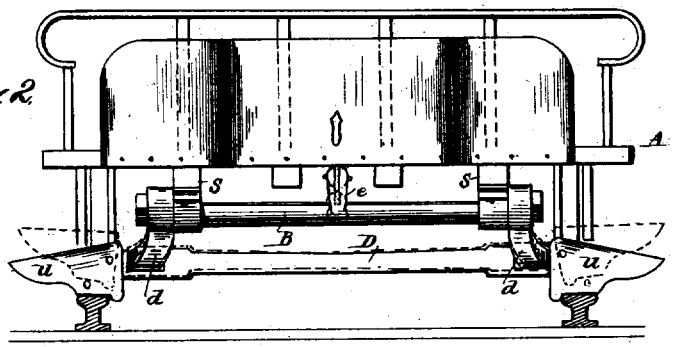
Figure 3:
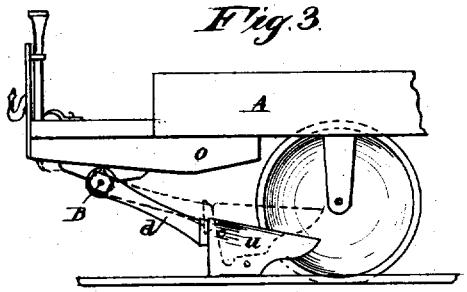
Figure 4:
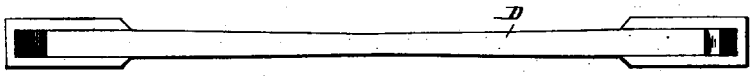
Figure 5:
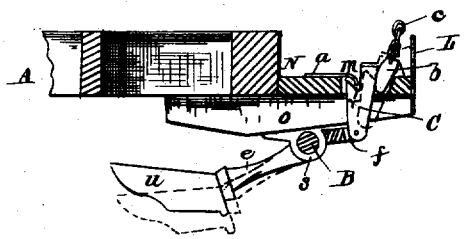
Figure 6:
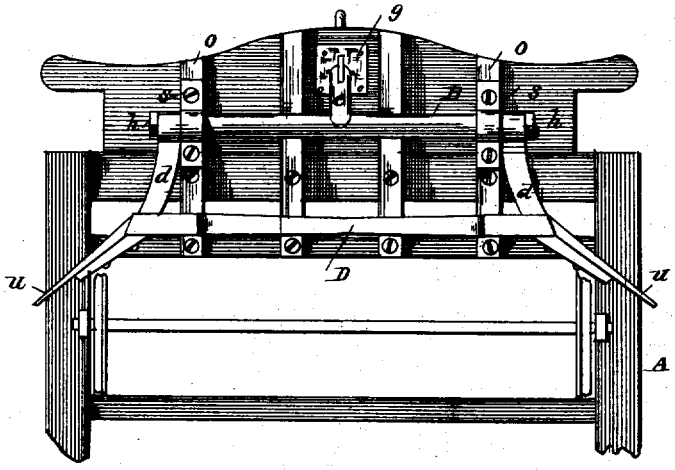

Figure 1 is a detail perspective view, partly in section, of a car-platform to which my improvement is attached, and showing fully the novel features. Fig. 2 is a bottom plan or inverted view of the car-platform to more fully illustrate my invention. Fig. 3 is a sectional view in detail taken on the line *x x*, Fig. 1; and Fig. 4 is a detail view of the stay brace or bar D. Fig. 5 is a sectional view of the device, and Fig. 6 is an under side view.

Letters of reference indicate the parts referred to throughout the specification, in which—

A represents the frame of an ordinary street-car.

B represents a rock-shaft or support, of any suitable metal, and extends transversely across the front of the under part of the car, and works in the bearings or hangers S S, which are bolted to the beams *o o*. At the center of the bar B projects an arm, *e*, formed integral therewith, and is provided at one end with the rectangular recess *f*.

C represents a foot-lever which is pivotally secured in the recess *f*, formed in the bar *e*, and works in the elongated slot *m*, formed in the platform N and plate *g*, which is designed to act as a guide for the lever. At the upper end of the lever is formed a groove, *r*, adapted to engage with the ratchet *a* to keep the scraper elevated above the track when its service is not needed.

It is possible in many instances for the lever C to become disconnected from the ratchet *a*, caused by sudden jars when descending grades, which would result in the dropping of the scrapers, and without timely warning might cause accident. Therefore, to prevent this, I provide a wedge or key, *b*, to fit tightly in that portion of the slot *m* left vacant by the lever when the scraper or cleaner is disengaged, as in Fig. 5. To the wedge is attached a chain, *c*, which is secured to the dash-board L, for the purpose of removing the wedge and keeping it within convenient reach of the driver.

*d d* are arms formed at a diverging angle to the rock-shaft B and again bent to still another diverging angle, which latter angle forms the support to which scrapers *u u* are secured. These arms and scrapers are retained in place coincident to the track by stay brace or bar D, which bears against the scrapers, preventing them from slipping and working out of place. The stay-brace D forms one of the essential features of my invention. Heretofore the angle-irons carrying the scrapers extended from the rock-shaft to the scrapers without any transverse support, except, perhaps, angular braces, which, as a whole, served no purpose except to prevent a collapse or closing of the scrapers together, and did not serve the purpose of stiffening the frame-work and keeping the scrapers to the track, which mine effectually does. This cross sustaining-bar is made in such manner that it can readily be put onto any track-cleaner of any width. I make it ordinarily of three pieces. The brace-bar has two stub-end heads—one at each end—and straps which can be slipped on said stub ends over the arms carrying the scrapers and afterward either keyed, bolted, or shrunk on the stub end of the bar. This cross-bar materially and effectually stiffens the frame of the track-cleaner and keeps the scrapers in position, thus avoiding the objection heretofore raised against track-cleaners of this character.

The arms *d d* are secured and held firmly at their upper ends to the rock-shaft B by nuts *h h*.

When the services of the scrapers are not wanted, the lever is pressed down by the foot of the driver and the groove *r* brought into contact with the ratchet *a*. Then the wedge or key *b* is dropped into the slot back of the lever, holding the cleaner mechanism firmly elevated above the track.

I wish to state here that the matter of the outline of the scraper is of prime importance in constructing my device. By making the scraper tapering in outline and making it light at its outer free end I secure the best possible results and the greatest safety, the reason being that the main weight of the scraper is practically on a line directly above the rail, so that when the scraper strikes a rigid obstruction along the track the communication of the force of the blow is direct to the heaviest portion of the scraper-blade, which latter, by reason of its being pivotally supported on an arm which is journaled to the car-platform a considerable distance in front of the point of contact of scraper and rail, and because of the scraper being very light at its outer free end, will fly up almost instantly without racking the scraper-arms and levers, and without breaking the blade.

I am aware that track-cleaners have been in use and operated by hand-levers which are secured in proximity to the outside of the dash-board and provided with cross-bars and angularly-set arms with scrapers attached, and do not claim such in my combination; but What I believe to be of my invention, and what I therefore claim, and desire to secure by Letters Patent, is—

1. In a track scraper and clearer of the character described, the rock-shaft and scraper-levers combined, and the lever and latch, said latch having a flattened head, in combination with the slotted platform, and a pawl for engaging the recesses in the latch, substantially as described, whereby the scrapers may be adjusted and held at any desired position with relation to the rail, as set forth.

2. In a scraper and clearer, the rock-shaft and lever for operating the same and the scraper-levers for carrying the scrapers, in combination with the scrapers, said scrapers having the agitators and the upward and outward inclined curved and tapered portions, substantially as described.

3. In a scraper and clearer, a rock-shaft provided with the rearwardly-extending scraper-levers and scrapers with the forward-extending lever-arm which is slotted to receive the latch, which latter is pivoted to the lever-arm in between the projections in the slotted end of the lever-arm, in combination with the said latch, substantially as described.

4. In a track-cleaner, the foot-lever and ratchet, the plate or guide, and the wedge, in combination with the arms, substantially as described.

5. In a track-cleaner, the foot-lever, the ratchet, the wedge and chain, the plate or guide, the stay-brace, and the oscillating frame B *d'*, in combination with the scrapers, substantially as described, and for the purpose set forth.

6. In a track-cleaner, the combination of the foot-lever C, placed on the interior of the dash-board L, pivotally secured to the arm *e* and working in the guide *g*, the ratchet *a*, adapted to engage with the groove *r*, the wedge *b* and the chain *c*, and the stay-brace D, holding in place the arms *d d* and scrapers *u u*, substantially as described, and for the purpose specified.

7. In a track scraper or clearer, the combination of the rock-shaft, the levers, and the scrapers, with the latch, the slotted platform, and the metallic slotted plating for said slot in the platform, substantially as described.

8. In a track scraper and clearer, the car having a rock-shaft pivotally secured thereto, in combination with scrapers and scraper-levers secured to the rock-shaft, and a bar, *e*, rigidly secured to the rock-shaft, and a vertically-reciprocating foot-lever secured to said bar, all constructed and combined to operate substantially as described, whereby the scrapers may be operated by the downward pressure of the foot, as set forth.

9. In a track scraper and clearer, the combination of the perforated car-platform with the scrapers and their supporting shaft and arms, and a bar which serves as a lever to tilt the scrapers and rock-shaft, said bar having a foot-lever which is vertically movable through the perforation in the car-platform, substantially as described.

In testimony whereof I affix my signature in presence of two witnesses.

HARVEY MITCHELL LITTELL.

Witnesses:
I. D. CAPLAN,
C. B. KENT.